(12) United States Patent
Huang (10) Patent No.: US 8,056,493 B2
(45) Date of Patent: Nov. 15, 2011

(54) UNDERWATER VEHICLE FOR SPEARFISHING

(75) Inventor: Chien-Chang Huang, Taitung (TW)

(73) Assignee: Li-Ling Lin, Taichung (TW)

( * ) Notice: Subject to any disclaimer, the term of this patent is extended or adjusted under 35 U.S.C. 154(b) by 286 days.

(21) Appl. No.: 12/437,151

(22) Filed: May 7, 2009

(65) Prior Publication Data

US 2010/0282158 A1    Nov. 11, 2010

(51) Int. Cl.
*B63C 11/46* (2006.01)

(52) U.S. Cl. ............. 114/315; 114/338; 124/56; 124/59

(58) Field of Classification Search .................. 114/315, 114/338; 124/22, 56, 59, 61; 42/1.14; 43/6
See application file for complete search history.

(56) References Cited

U.S. PATENT DOCUMENTS

| | | | | |
|---|---|---|---|---|
| 3,957,007 | A | * | 5/1976 | Thomas ......................... 114/315 |
| 4,019,480 | A | * | 4/1977 | Kenaio ............................. 124/61 |
| 4,813,367 | A | * | 3/1989 | Stevenson ..................... 114/315 |

* cited by examiner

*Primary Examiner* — Lars A Olson (57) ABSTRACT

The present invention provides an underwater vehicle for spearfishing, comprises a carrier unit, at least one actuator unit connected to the carrier unit and having a motor and a propeller driven by the motor to rotate, at least one image acquiring unit connected to the carrier unit for acquiring images, and at least one spearing unit connected to the carrier unit and including an air cylinder, a spear shaft driven by the air cylinder to move forwards and backwards, and a spear tip connected to a front end of the spear shaft for catching targeted animals. The underwater vehicle of the present invention provides necessary assistance to a user to carry out underwater activities and spearfishing in an easy and safe manner without the need of being accompanied by a professional instructor.

20 Claims, 6 Drawing Sheets

UNDERWATER VEHICLE FOR SPEARFISHING

FIELD OF THE INVENTION

The present invention relates to an underwater vehicle for spearfishing, and more particularly to an underwater vehicle for spearfishing that helps a user to carry out underwater activities and spearfishing in an easy and safe manner without the need of being accompanied by a professional instructor.

BACKGROUND OF THE INVENTION

Fishing and underwater spearfishing are outdoor leisure activities that have becoming popular in recent years. Fishing actually requires long-term experience to master the skill. The underwater spearfishing requires full knowledge about deep water and good diving skill to be able to carry out the activity safely. Therefore, fishing and underwater spearfishing are generally considered to be highly difficult leisure activities.

It is therefore an objective of the present invention to develop an underwater vehicle for spearfishing to help a user in doing underwater activities and spearfishing in an easy and safe manner without the need of being accompanied by a professional instructor.

SUMMARY OF THE INVENTION

A primary object of the present invention is to provide an underwater vehicle for assisting the spearfishing activity, comprising a carrier unit, an actuator unit, an image acquiring unit, and a spearing unit to help a user to carry out underwater activities and spearfishing in an easy and safe manner without the need of being accompanied by a professional instructor.

To achieve the above and other objects, the underwater vehicle for spearfishing according to a preferred embodiment of the present invention comprises a carrier unit; at least one actuator unit connected to the carrier unit, and having a motor and a propeller driven by the motor to rotate and provide the power to move the underwater vehicle; at least one image acquiring unit connected to the carrier unit for acquiring images; and at least one spearing unit connected to the carrier unit, wherein the spearing unit further comprises an air cylinder, a spear shaft driven by the air cylinder to move forward, and a spear tip connected to a front end of the spear shaft for catching aquatic animals.

The underwater vehicle in accordance with another preferred embodiment of the present invention is design in such that the underwater vehicle comprises an air cylinder in the spearing unit, which communicates with an air storage unit via an air valve, wherein the air valve communicates with an exhaust receiving unit via a first check valve; the exhaust receiving unit also communicates with a second check valve and a third check valve. The second check valve communicates with the air storage unit via an air circulating unit, and the air storage unit communicates with an air supply unit to obtain air from the air supply unit. The exhaust receiving unit further comprises an air compressor for discharging the air that has been used in such that the exhaust receiving unit under water can assist—a user to dive under water and to carry out the underwater activities and spearfishing in an easy and safe manner.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
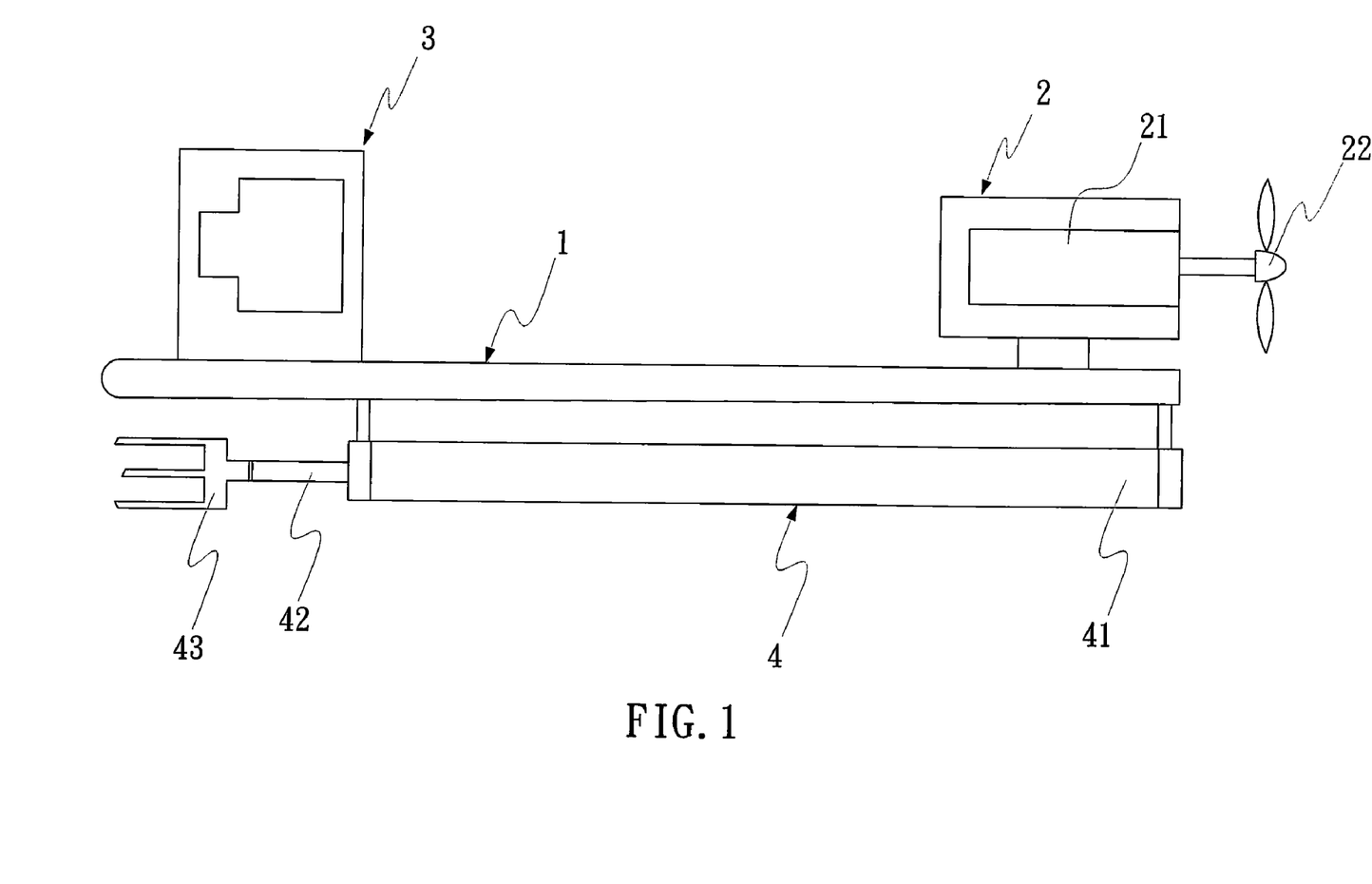
FIG. 1 is a schematic view showing a structure of an underwater vehicle for spearfishing according to a first preferred embodiment of the present invention.

FIG. 1, a schematic view showing a structure of an underwater vehicle for spearfishing according to a first preferred embodiment of the present invention, wherein the underwater vehicle for spearfishing comprises a carrier unit 1, at least one actuator unit 2, at least one image acquiring unit 3, and at least one spearing unit 4.

The carrier unit 1 is utilized to carry the actuator unit 2, the image acquiring unit 3, and the spearing unit 4 that are installed at sides of carrier unit 1.

The actuator unit 2 is connected to the carrier unit 1 for providing power to move the underwater vehicle, and the actuator unit 2 comprises a motor 21 and a propeller 22 driven by the motor 21 to perform the rotation movement.

The image acquiring unit 3 is connected to the carrier unit 1 for acquiring images while the carrier unit 1 is moving.

The spearing unit 4 is connected to the carrier unit 1, and comprises an air cylinder 41, a spear shaft 42 which is driven by the air cylinder 41 to move forwards and backwards, and a spear tip 43 that is connected to a front end of the spear shaft 42 for catching sea animals. The spear tip 43 of the spearing unit 4 can be a pointed head with single spear or a head with spears. Further, the spear shaft 42 in accordance with this preferred embodiment of the present invention is a single section of shaft, but a multi-section of shaft can be utilized in the present invention to extend the length of the spear shaft 42. Therefore, the spear tip 43 and the spear shaft 42 of the present invention are not limited to this preferred embodiment, other shapes and sizes of spear equipments can be employed.

Figure 2:
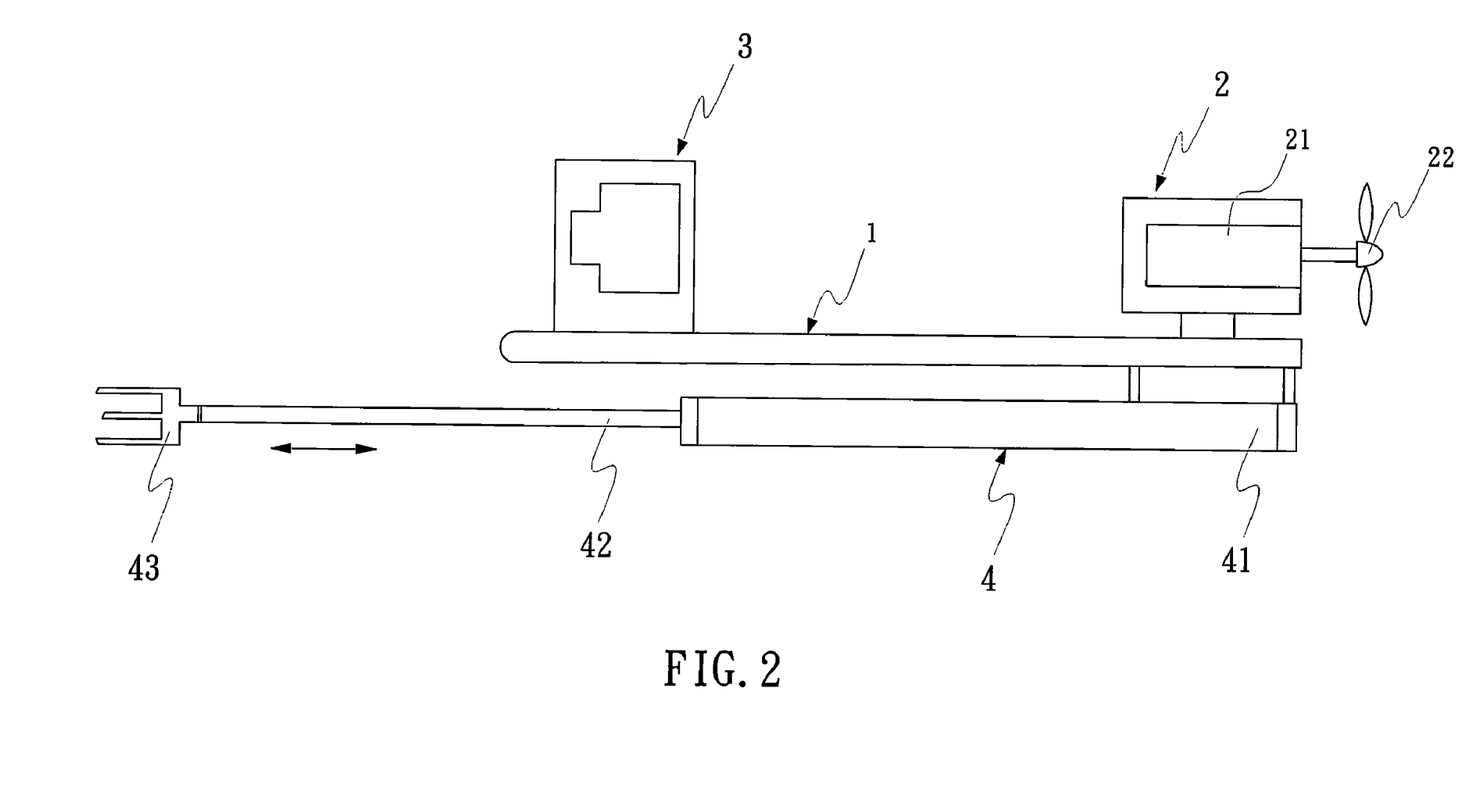
FIG. 2 shows a first application of the underwater vehicle of FIG. 1.
Figure 3:
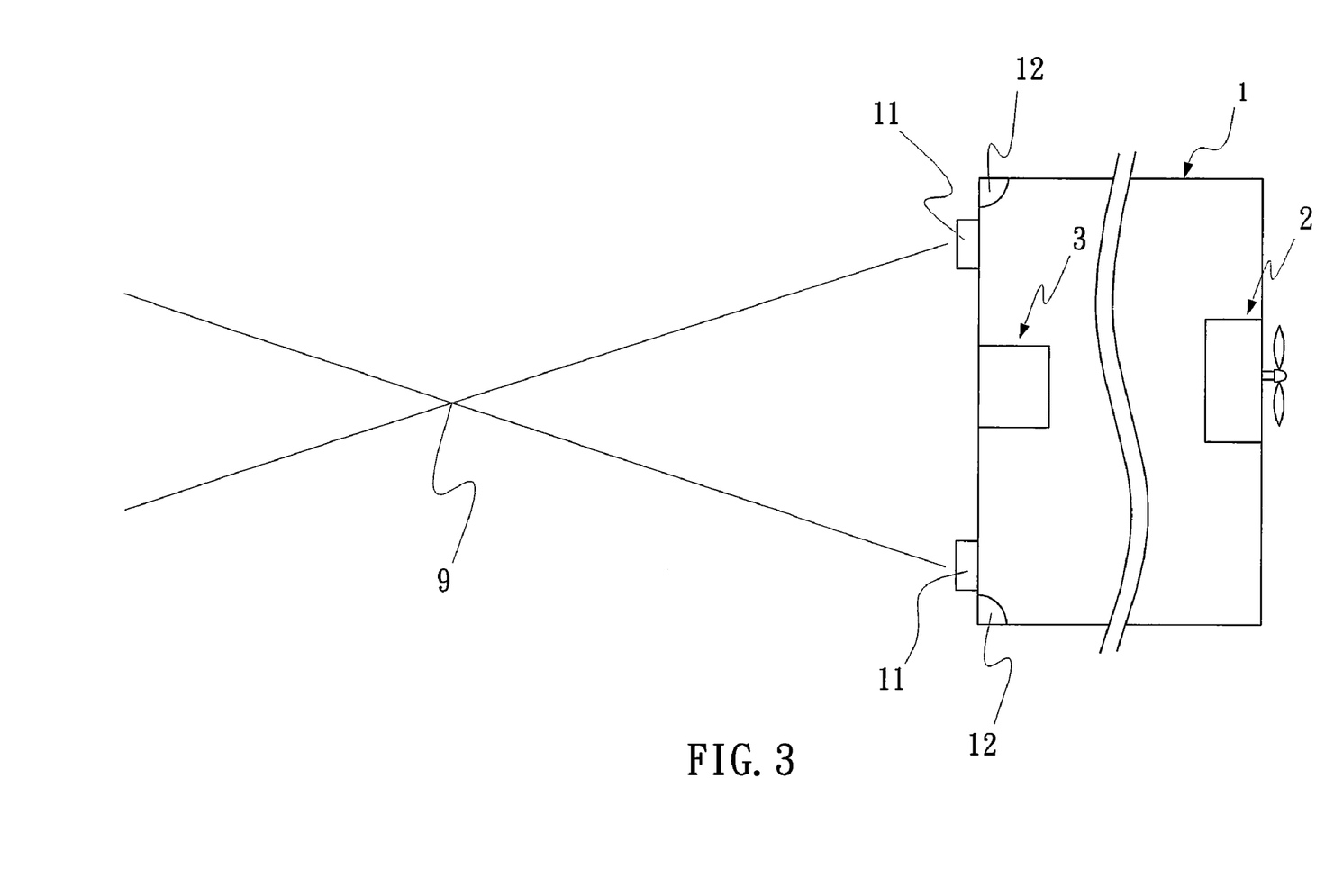
FIG. 3 is a top view showing a second application of the underwater vehicle of FIG. 1 for spearfishing.

FIGS. 2 & 3 shows the spearfishing applications of the underwater vehicle of FIG. 1 in accordance with the first preferred embodiment of the present invention. To use the underwater vehicle for spearfishing, the motor 21 of the actuator unit 2 is first initiated to start the motor 21 to rotate the propeller 22. The rotation power provided by the underwater vehicle is capable of assisting the user to go underwater easily with any difficulty. In other words, the underwater vehicle assists the user to dive under water easily by using the combination of the carrier unit 1 and the actuator unit 2. The underwater vehicle of the present invention is specifically designed in such that two or more actuator units 2 can be used on the carrier unit 1 at different positions (not shown) to provide more power to assist the user for various applications. The actuator units 2 are separately actuated to change the moving direction of the underwater vehicle. When the user dives under water with the underwater vehicle, the carrier unit 1 and the actuator units 2 of the underwater vehicle provide the necessary power to assist the user to dive and move under the water easily. Further, the user can use the image acquiring unit 3 to acquire images under water at the same time to locate the desired target. Meanwhile, the spear tip 43 and spear shaft 42 located on the front part of the air cylinder 41 of the spearing unit 4 is capable of moving forwards and back to assist the user to catch aquatic animals. The movement of the spear tip 43 and the spear shaft 42 is controlled by the user. When the user locate the desired target at a certain distance, he can push a control button on the underwater vehicle to shot the spear tip 43 and spear shaft 42 forwards to spear the target.

The underwater vehicle is driven by the motor 21, if there is an emergency occurred, the user/diver can rely on the underwater vehicle to come up to the surface as soon as possible within the safe limits. The underwater vehicle also can serve as an assistant tool to help the diver to move from one destination to another easily without spending a lot of energy. Therefore, the underwater vehicle of the present invention allows the user to carry out the underwater activities, such as spearfishing easily and safely. Further, the underwater vehicle is designed to be operated easily without the complicated operations, and the diver/user can use and operate the underwater vehicle easily without much difficulty. Moreover, the underwater vehicle can serve as an assistant tool to the diver or user in order to preserve his/her energy spent in the water, therefore, with less energy is required, the diver or user can actually spend more time under water and enjoy the underwater activities more. Since the underwater vehicle of the present invention can allow the user or diver to operate easily and safely to carry out the underwater activities, such as spearfishing, therefore, it is not necessary for the user to be accompanied by a professional instructor when doing underwater activities and spearfishing.

The underwater vehicle of the present invention is designed in such that a plurality of image acquiring units 3 and a plurality of spearing units 4 can be separately arranged on the carrier unit 1 at different positions (not shown), so that the images of the underwater and targeted objects can be acquired from different directions by using the image acquiring units 3. As a result, it is more convenient and easily to locate the target animals at different positions, the underwater vehicle also provides an easy way to catch the target with the spearing units 4.

FIG. 3 shows a top view showing a second application of the underwater vehicle of FIG. 1 for spearfishing, wherein laser locators 11 and illuminating units 12 are further provided on the carrier unit 1. The laser locators 11 provide an intersection 9 as shown in FIG. 3, the user or diver can locate the position of the targeted object easily through the laser locators 11. Once the targeted object is located, the diver/user uses the spearing unit 4 to target and catch the object. The illuminating units 12 provide lighting under the water in order to increase the visibility, and the image acquiring unit 3 is used in the underwater vehicle to obtain the images under the water so the diver/user can view underwater images clearly from the image acquiring unit 3. The underwater vehicle of the present invention can be used during the nighttime or where the visibility is poor because the designs of the illuminating units 12, the leaser locators 11 and the image acquiring unit 3 provide assistance to the diver or user to view better underwater. The underwater vehicle of the invention helps the diver or user to locate the desired target easily and catch targets even in a poor visible condition. Thus, the underwater vehicle of the present invention provides a better way to carry those underwater activities, such as spearfishing, easily and safely without much restriction.

Figure 4:
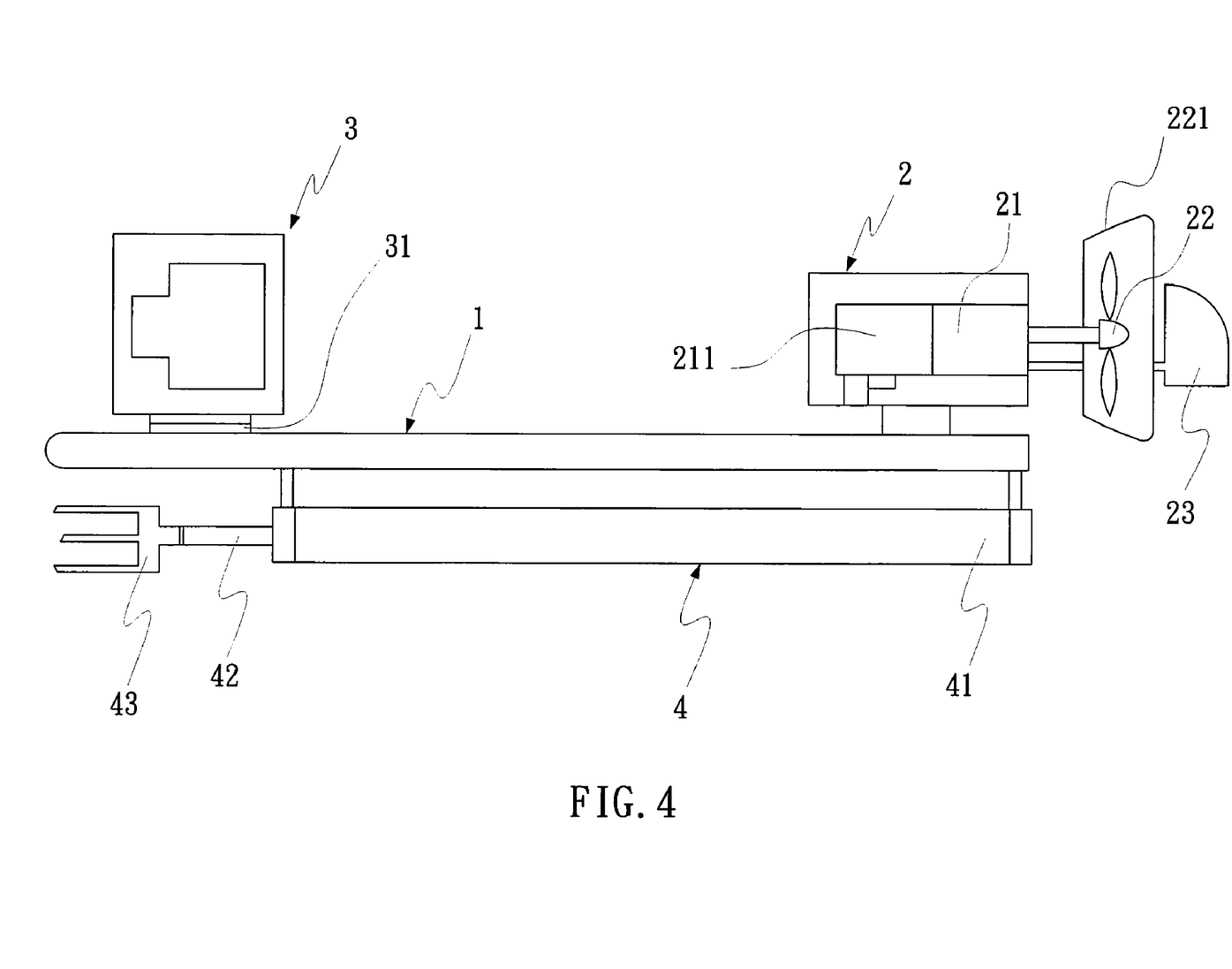
FIG. 4 is a schematic view showing the structure of an underwater vehicle for spearfishing according to a second preferred embodiment of the present invention.

FIG. 4 is a schematic view showing the structure of an underwater vehicle for spearfishing according to a second preferred embodiment of the present invention. The actuator unit 2 for the underwater vehicle for spearfishing according to the second preferred embodiment of the present invention further comprises a plurality of rudders 23 for changing the moving direction of the carrier unit 1; the motor 21 comprises a gear reducer 211 for increasing torsion force; a protection shroud 221 is provided around the propeller 22 for protecting the propeller 22; and the image acquiring unit 3 is connected to the carrier unit 1 via a rotatable seat 31 so that the image acquiring unit 3 can acquire images within an expanded visual field.

Figure 5:
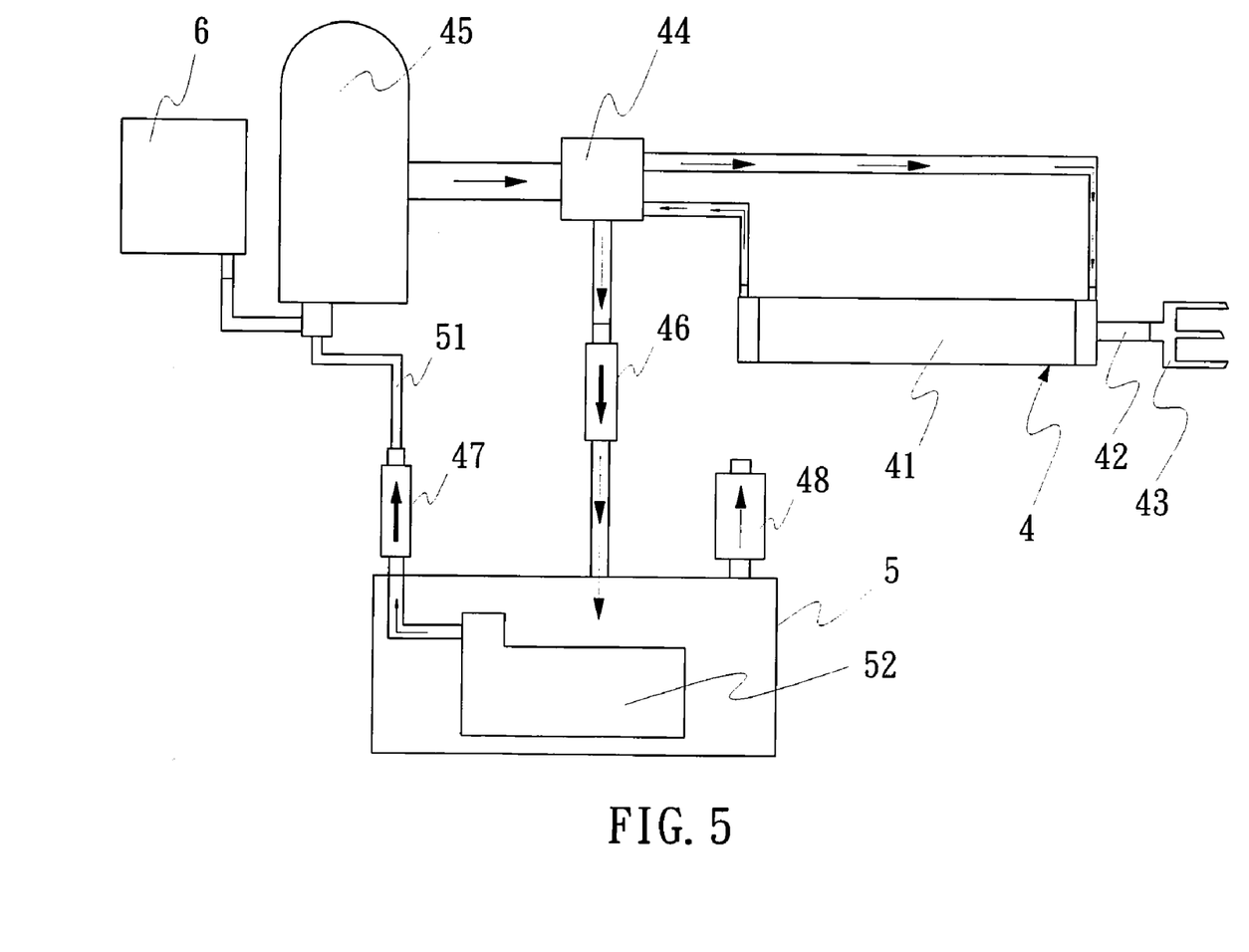
FIG. 5 shows an embodiment of a spearing unit of an underwater vehicle for spearfishing in accordance with a third preferred embodiment of the present invention.
Figure 6:
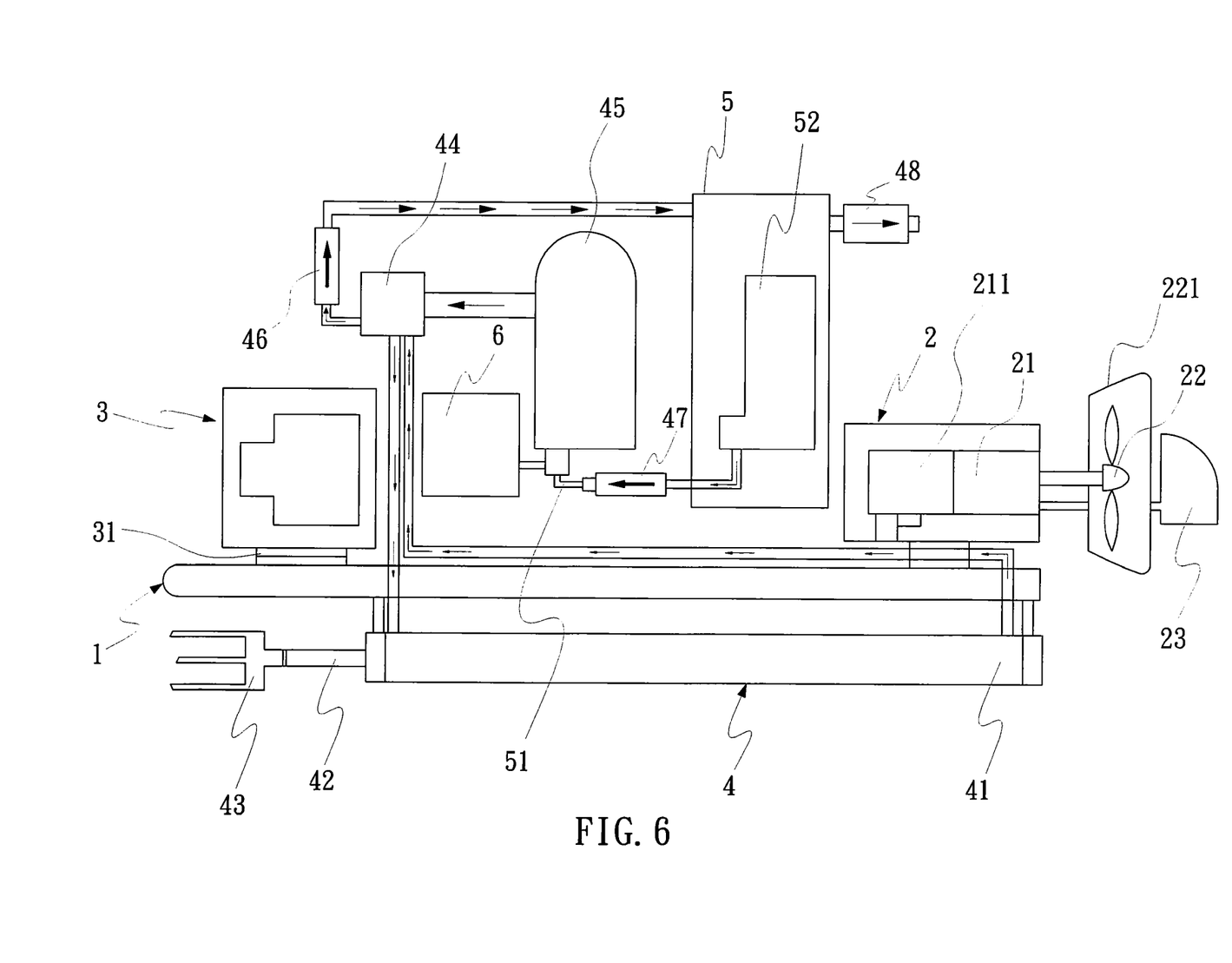
FIG. 6 is an underwater vehicle for spearfishing in accordance with a forth preferred embodiment of the present invention.

FIG. 5 shows a schematic view of how the air flowed and discharged between the air cylinder and the exhaust receiving unit 5 of the underwater vehicle in accordance with a third preferred embodiment of the present invention, and FIG. 6 shows a schematic view of a underwater vehicle in accordance with a fourth embodiment of the present invention. Refer to FIG. 5, the air cylinder 41 of the spearing unit 4 communicates with an air storage unit 45 via an air valve 44, and the air valve 44 communicates with an exhaust receiving unit 5 via a first check valve 46; and the exhaust receiving unit 5 also communicates with a second check valve 47 and a third check valve 48. The second check valve 47 communicates with the air storage unit 45 via an air circulating unit 51, and the air storage unit 45 communicates with an air supply unit 6 to obtain air from the air supply unit 6. The exhaust receiving unit 5 comprises an air compressor 52 for discharging the air that has been used under water.

When the user triggers the control button on the underwater vehicle, the spearing unit 4 is actuated, the compressed air stored in the air storage unit 45 is supplied to the air cylinder 41 via the air valve 44. The spear shaft 42 and the spear tip 43 are then driven forwards by the air cylinder 41 to catch the targeted animals. Meanwhile, air that is previously remained in the air cylinder 41 is discharged through the air valve 44. To prevent external water from entering the air cylinder 41, the air flowed to the air valve 44 is further discharged to the first check valve 46. The air is then discharged from the first check valve 46 into the exhaust receiving unit 5. The air entered the exhaust receiving unit 5 is then discharged via the second check valve 47. Normally, due to the high water pressure outside the spearing unit 4, the used air cannot be discharged quickly to outside spearing unit 4 and exhaust receiving unit 5. But the exhaust receiving unit 5 of the present invention is designed in such that, the air in the exhaust receiving unit 5 is discharged through the second check valve 47 as shown in FIG. 5, then into the external water. As a result, the air space of the exhaust receiving unit 5 is increased when the air is discharged through the second check valve 47 so that the spear shaft 42 and spear tip 43 are driven and moved freely under water. In other words, the underwater vehicle of the third preferred embodiment of the present invention is designed in such that the spear tip 43 and spear shaft 42 can be functioned easily and freely under the water. The whole set-up in FIG. 5 can be installed at one side of the underwater vehicle as shown in FIG. 6.

From FIGS. 5 and 6, the external water pressure increases with the depth of the water. The air compressor 52 is designed to discharge the used air against the high water pressure under deep water and push the used air into second check valve 47. The used air flowed through the second check valve 47 is sent to the air storage unit 45 via the air circulating unit 51 so that the air can be circulated for the reuse purpose. When the underwater vehicle—is used at shallow water or at a relatively small depth from the surface, the water pressure is relative very low, the used air is then directly discharged via the third check valve 48 to reduce the load of the air compressor 52 in discharging the used air.

FIG. 6 shows that the actuator unit 2, the protection shroud, the image acquiring unit 3, the spearing unit 4 connected to the carrier unit 1, the air supply unit 6, the exhaust receiving unit 5, air storage unit 45, an air valve 44, an second check valve 47 and the third check valve 48 are installed at the sides of the carrier unit 1 of the underwater vehicle for spearfishing according to the fourth embodiment of the present invention to allow the user to carry out the underwater activities and spearfishing easily in a safe manner without the need to be accompanied by a professional instructor. Therefore, the present invention is novel, improved, and industrially practical for use to meet potential market demands.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An underwater vehicle, capable of using for diving and spearfishing, comprising:
    a carrier unit;
    at least one actuator unit being connected to the carrier unit and comprising a motor and a propeller, wherein the propeller is driven by the motor to rotate and thereby providing power needed by the carrier unit to move;
    at least one image acquiring unit being connected to the carrier unit for acquiring required images; and
    at least one spearing unit being connected to the carrier unit, wherein an air cylinder, a spear shaft are provided and the spear shaft is driven by the air cylinder to move forwards and backwards, and a spear tip is connected to a front end of the spear shaft for catching targeted animals;
    a plurality of rudders for changing moving directions of the carrier unit, and the motor comprises a gear reducer for increasing torsion force, and a protection shroud is provided around the propeller, and a plurality of the actuator units is installed separately at different positions along the carrier unit.

2. The underwater vehicle of claim 1, further comprising laser locators to locate an object by using lasers and illuminating units located at the carrier unit.

3. The underwater vehicle of claim 1, wherein the spear tip of the spearing unit is selected from the group consisting of a pointed head with single spear or a head with several spears.

4. The underwater vehicle of claim 1, wherein the spear shaft connected to the air cylinder of the spearing unit is a multi-section of shaft for extending or reducing a length of the spear shaft.

5. The underwater vehicle of claim 1, wherein a plurality of the spearing units is provided, and the spearing units are separately located at different positions along the carrier unit.

6. The underwater vehicle of claim 1, wherein the spearing unit further comprises an air storage unit communicating with the air cylinder via an air valve; an exhaust receiving unit communicating with the air valve via a first check valve; a second check valve and a third check valve communicating with the exhaust receiving unit; and an air circulating unit, in which the second check valve communicating with the air storage unit.

7. The underwater vehicle of claim 6, wherein the spearing unit further comprises an air supply unit communicating with the air storage unit, and the exhaust receiving unit has an air compressor.

8. An underwater vehicle, capable of using for diving and spearfishing, comprising:
    a carrier unit;
    at least one actuator unit being connected to the carrier unit and comprising a motor and a propeller, wherein the propeller is driven by the motor to rotate and thereby providing power needed by the carrier unit to move;
    at least one image acquiring unit being connected to the carrier unit for acquiring required images; and
    at least one spearing unit being connected to the carrier unit, wherein an air cylinder, a spear shaft are provided and the spear shaft is driven by the air cylinder to move forwards and backwards, and a spear tip is connected to a front end of the spear shaft for catching targeted animals;
    wherein the image acquiring unit is connected to the carrier unit via a rotatable seat, a plurality of the image acquiring units are separately arranged at different positions along the carrier unit.

9. The underwater vehicle of claim 8, further comprising laser locators to locate an object by using lasers and illuminating units located at the carrier unit.

10. The underwater vehicle of claim 8, wherein the actuator unit further a plurality of rudders for changing moving directions of the carrier unit, and the motor comprises a gear reducer for increasing torsion force, and a protection shroud is provided around the propeller, and a plurality of the actuator units is installed separately at different positions along the carrier unit.

11. The underwater vehicle of claim 8, wherein the spear shaft connected to the air cylinder of the spearing unit is a multi-section of shaft for extending or reducing a length of the spear shaft.

12. The underwater vehicle of claim 8, wherein a plurality of the spearing units is provided, and the spearing units are separately located at different positions along the carrier unit.

13. The underwater vehicle of claim 8, wherein the spearing unit further comprises an air storage unit communicating with the air cylinder via an air valve; an exhaust receiving unit communicating with the air valve via a first check valve; a second check valve and a third check valve communicating with the exhaust receiving unit; and an air circulating unit, in which the second check valve communicating with the air storage unit.

14. The underwater vehicle of claim 8, wherein the spearing unit further comprises an air storage unit communicating with the air cylinder via an air valve; an exhaust receiving unit communicating with the air valve via a first check valve; a second check valve and a third check valve communicating with the exhaust receiving unit; and an air circulating unit, in which the second check valve communicating with the air storage unit.

15. The underwater vehicle of claim 14, wherein the spearing unit further comprises an air supply unit communicating with the air storage unit, and the exhaust receiving unit has an air compressor.

16. An underwater vehicle, capable of using for diving and spearfishing, comprising:
    a carrier unit;
    at least one actuator unit being connected to the carrier unit and comprising a motor and a propeller, wherein the propeller is driven by the motor to rotate and thereby providing power needed by the carrier unit to move;

at least one image acquiring unit being connected to the carrier unit for acquiring required images; and at least one spearing unit being connected to the carrier unit, wherein an air cylinder, a spear shaft are provided and the spear shaft is driven by the air cylinder to move forwards and backwards, and a spear tip is connected to a front end of the spear shaft for catching targeted animals;

wherein the spearing unit further comprises an air storage unit communicating with the air cylinder via an air valve; an exhaust receiving unit communicating with the air valve via a first check valve; a second check valve and a third check valve communicating with the exhaust receiving unit; and an air circulating unit, in which the second check valve communicating with the air storage unit.

17. The underwater vehicle of claim 16, wherein the spearing unit further comprises an air supply unit communicating with the air storage unit, and the exhaust receiving unit has an air compressor.

18. The underwater vehicle of claim 16, further comprising laser locators to locate an object by using lasers and illuminating units located at the carrier unit.

19. The underwater vehicle of claim 16, wherein the actuator unit further a plurality of rudders for changing moving directions of the carrier unit, and the motor comprises a gear reducer for increasing torsion force, and a protection shroud is provided around the propeller, and a plurality of the actuator units is installed separately at different positions along the carrier unit.

20. The underwater vehicle of claim 16, wherein the image acquiring unit is connected to the carrier unit via a rotatable seat, a plurality of the image acquiring units are separately arranged at different positions along the carrier unit.

* * * * *